(12) United States Patent
Boston et al.

(10) Patent No.: US 7,195,792 B2
(45) Date of Patent: Mar. 27, 2007

(54) BROWNING AGENT

(75) Inventors: Matthew G. Boston, Palo Alto, CA (US); Gregory M. Whited, Palo Alto, CA (US)

(73) Assignee: Genencor International, Inc., Palo Alto, CA (US)

( * ) Notice: Subject to any disclaimer, the term of this patent is extended or adjusted under 35 U.S.C. 154(b) by 11 days.

(21) Appl. No.: 10/500,945

(22) PCT Filed: Feb. 21, 2003

(86) PCT No.: PCT/US03/05311
§ 371 (c)(1),
(2), (4) Date: Jun. 30, 2005

(87) PCT Pub. No.: WO03/071879
PCT Pub. Date: Sep. 4, 2003

(65) Prior Publication Data
US 2006/0003061 A1    Jan. 5, 2006

(51) Int. Cl.
*A23L 1/27* (2006.01)

(52) U.S. Cl. ..................... 426/268; 426/262

(58) Field of Classification Search ............ None
See application file for complete search history.

(56) References Cited

U.S. PATENT DOCUMENTS

| | | | |
|---|---|---|---|
| 2,301,811 A | 11/1942 | Reichstein | |
| 3,790,444 A | 2/1974 | Oga et al. | 195/47 |
| 3,907,639 A | 9/1975 | Makover et al. | 195/36 R |
| 4,190,757 A | 2/1980 | Turpin et al. | 219/10.55 E |
| 4,230,880 A * | 10/1980 | Andrews | 560/174 |
| 4,252,832 A | 2/1981 | Moody | 426/241 |
| RE30,872 E | 2/1982 | Sonoyama et al. | 435/138 |
| 4,448,791 A | 5/1984 | Fulde et al. | 426/94 |
| 4,641,005 A | 2/1987 | Seiferth | 219/10.55 E |
| 4,879,229 A | 11/1989 | Sonoyama et al. | 435/138 |
| 4,904,490 A | 2/1990 | Buckholz, Jr. et al. | |
| 4,917,907 A | 4/1990 | Kwis et al. | 426/90 |
| 4,968,522 A | 11/1990 | Steinke et al. | 426/602 |
| 4,985,261 A * | 1/1991 | Kang et al. | 426/243 |
| 5,032,514 A | 7/1991 | Anderson et al. | 435/138 |
| 5,043,173 A | 8/1991 | Steinke et al. | 426/94 |
| 5,059,434 A * | 10/1991 | Kang et al. | 426/96 |
| 5,089,278 A * | 2/1992 | Haynes et al. | 426/98 |
| 5,091,200 A | 2/1992 | Kang et al. | 426/243 |
| 5,135,770 A | 8/1992 | Underwood | 426/650 |
| 5,196,219 A | 3/1993 | Hsu et al. | 426/302 |
| 5,756,140 A | 5/1998 | Shoop et al. | 426/302 |
| 6,261,612 B1 | 7/2001 | Ballard et al. | 426/94 |
| 6,500,649 B2 * | 12/2002 | Fouache et al. | 435/72 |

FOREIGN PATENT DOCUMENTS

| | | |
|---|---|---|
| EP | 0 203 725 | 3/1986 |
| EP | 0 477 832 A1 | 9/2001 |
| WO | WO 00/37667 | 6/2000 |

OTHER PUBLICATIONS

Hurrell, R. F.. 1982. Maillard Reaction in Flavour in Food Flavours Part A., edited by Morton, I.D., Elsevier Scientific Publishing Co., New York, pp. 399-405.*

Seaver, U. I. 1946. The "Browning (Maillard) Reaction" in Heated Solutions of Uronic AcidsJ. Am. Chemi. Soc, 68:2178-2179.*

Katznelson, H. et al., << Glucose, Gluconate, and 2-Ketogluconate Oxidation by Acetobacter Melanogenum, >> J. Biol. Chem., vol. 204, pp. 43-59, 1953.

Wakisaka, Y., Agric. Biol. Chem., vol. 28, No. 12, pp. 819-827, 1964.

The Supplementary Search Report.

* cited by examiner

*Primary Examiner*—Carolyn Paden
(74) *Attorney, Agent, or Firm*—Lynn Marcus-Wyner

(57) ABSTRACT

A browning agent for foodstuffs having at least two carbonyl groups is disclosed. A method for using the browning agent in or on a substrate is also disclosed. The browning agent may be coated onto foodstuffs such as biscuits, pizza, pie coverings or hash brown potatoes and heated by microwave or convection oven to induce browning.

24 Claims, 2 Drawing Sheets

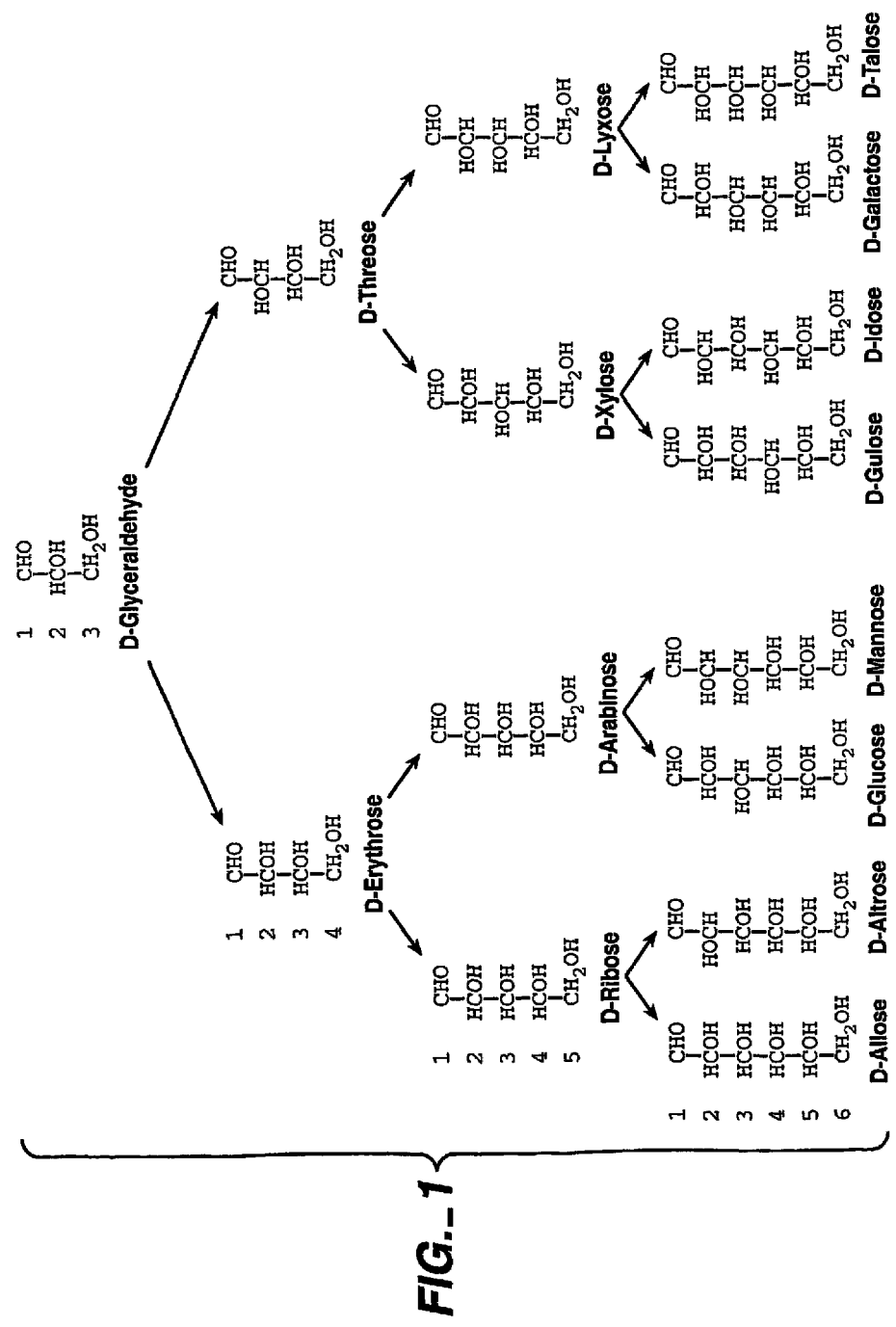
FIG._1

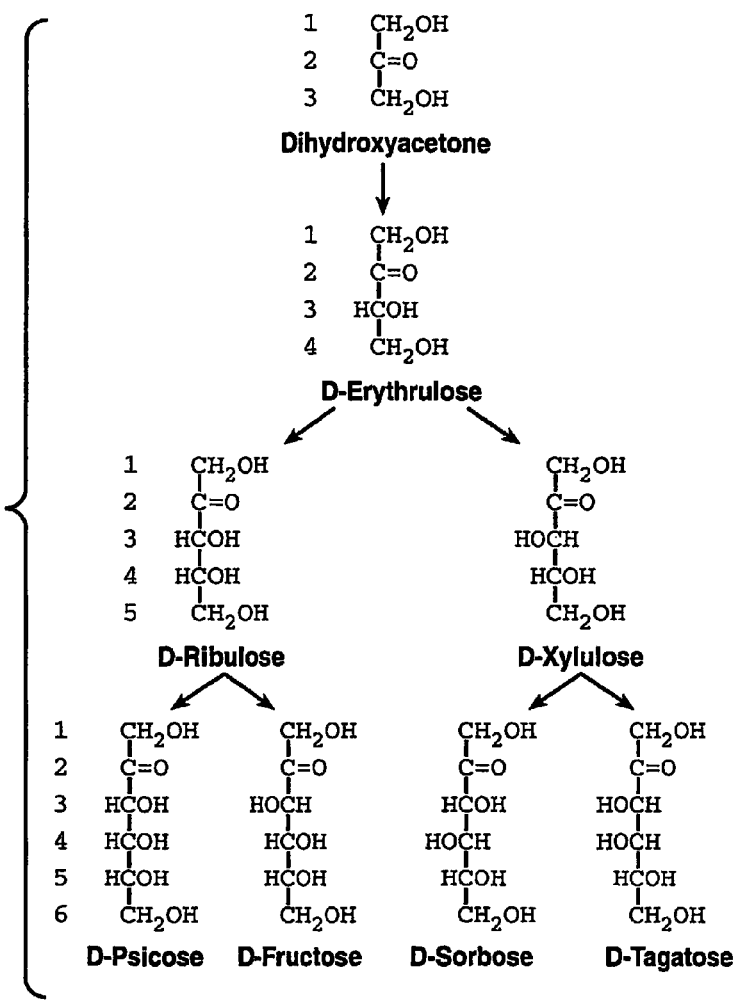
FIG._2
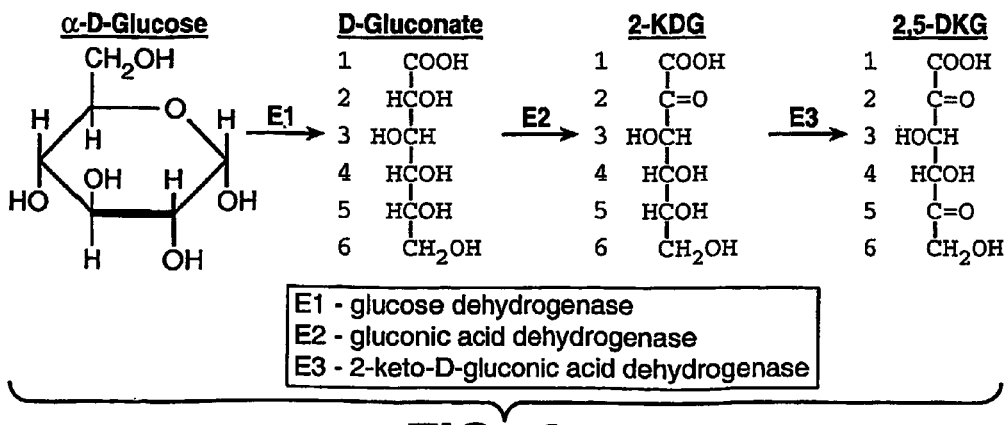
FIG 3

BROWNING AGENT

FIELD OF THE INVENTION

The present invention relates to compositions which brown in a conventional or microwave oven and methods of their use. The present invention further relates to sugar or sugar acid compounds and their use as browning agents, for example with foodstuffs heated in microwave ovens.

DESCRIPTION OF THE BACKGROUND

Microwave ovens have become common appliances in most American households. In today's fast paced society, the savings in cooking time that microwaves afford over conventional ovens have made them an appliance of choice for meal preparation. In particular, microwave ovens are most commonly used to reheat foods, to defrost and/or cook frozen prepared and packaged foods.

One of the largest drawbacks in microwave cooking is that foods, even when fully cooked, do not exhibit a fully developed "oven-browned" color. This is a particular problem with microwave cooked pies because consumers expect a pie to have a golden brown color and a certain slightly crispy texture when cooked. Instead, microwave cooked pies tend to have a dull grayish appearance which is generally unpalatable to the average consumer. To overcome these drawbacks, food manufacturers have developed various chemical techniques, food coloring and packaging configurations to help foodstuffs cooked in a microwave achieve a similar golden brown color and crisp texture associated with conventional oven cooking.

The most common reaction responsible for surface browning during cooking is the Maillard reaction (non enzymatic browning) between naturally occurring reducing sugars and compounds containing an amino acid group, e.g. amino acids, peptides and, proteins which results in the formation of colored melanoidins. Maillard reaction rates are increased with an increase in temperature, pH, concentration of Maillard reactants, water activity, oxygen supply, and nature of the raw materials among other factors. When a foodstuff is cooked in a conventional oven, the surface of the foodstuff is heated to considerably higher temperatures than the interior layers of the foodstuff, with the high surface temperatures being sufficient to achieve browning. A number of patents have issued directed to browning agents for foodstuffs having carbonyl-containing components for the browning reaction and, in particular, as microwavable browning coatings including U.S. Pat. No. 4,448,791; and European Patent Application No. 0 203 725 (1986). These patent publications are directed to browning agents and compositions that depend upon the reaction of an amino acid and sugar, especially as the reaction may be catalyzed by the addition of alkali to allow the reaction to take place at lower temperatures.

In microwave cooking, however, heat energy is released internally within the food so that the surface and interior remain at relatively similar temperatures. Consequently, the high surface temperatures necessary to achieve conventional oven type browning are not reached within the time required to cook a foodstuff in the microwave. To achieve the golden brown color of microwave cooking, food manufacturers have generally developed ways to treat the surfaces of various foodstuffs with browning agents. Some of these browning agents are either prereacted or partially reacted and applied like a sauce to foodstuffs to give them a golden brown appearance even before the food is cooked. This effect is enhanced during cooking. Other, more modern browning agents help induce the Maillard reaction at lower temperatures and faster cooking times by adjusting the other variables, such as pH and Maillard reactant concentration, to enhance browning at the surface of a foodstuff during microwave cooking.

An aqueous syrup containing a melted, caramelized, and foamed disaccharide, alone or in combination with a minor amount of monosaccharide has been described as a browning agent for foods cooked in a microwave oven. U.S. Pat. No. 4,252,832. This aqueous syrup is first heated until it produces a dark syrupy composition, mixed with salt, then brushed onto foods such as meats, poultry, fish, cakes, pies, or french-fry cut potatoes to give them a golden brown color even when they are cooked in a microwave.

A browning agent containing food starting materials and at least one carbohydrate having beta configuration has been described for use as a sauce base or meat flavor concentrate. The browning agent is prepared by heating hexose, glucose, or disaccharides having a beta-configuration with a food starting material such as potatoes, milled cereals, meat, bone, milk products, etc. at 100–200° C. for 10–30 minutes. The product undergoes a Maillard reaction during heating and the resulting brown colored browning agent can be used as a starting material for various uses such as a sauce base.

A browning agent containing a water-in-oil emulsion, a surfactant, and an edible base in an aqueous phase has been described for browning foodstuffs having a carbonyl containing browning reactant. U.S. Pat. No. 4,968,522. The emulsion can be coated onto pizza, pot pie doughs, processed potato nuggets (e.g., frozen shredded potatoes sold under the tradename "Tatertots" by Ore-Ida Potato Products, Inc. a division of H J Heinz of Pittsburg, Pa.) and hash browns. The water-in-oil emulsion prevents the edible base from contacting the carbonyl containing browning reactant in the foodstuff until the foodstuff is heated in a microwave or conventional oven. When this browning agent is subjected to heat, the edible base is released from the emulsion causing the pH of the surface of a foodstuff to increase, thereby inducing the browning reaction.

A browning composition for microwave foodstuffs obtained by spray drying a solution containing reducing sugar and milk protein has also been described. U.S. Pat. No. 5,196,219. The browning composition is produced by hydrolyzing an aqueous solution of milk solids, such as skim milk, evaporated skim milk and reconstituted non-fat dry milk, with lactase enzyme to convert substantially all of the lactose in the solution to glucose and galactose, and spray drying the hydrolyzed milk solids solution. During spray drying, Amadori rearrangement products, which are intermediary compounds in the formation of colored Maillard reaction products, are formed in the spray dried product. The spray dried product is reconstituted with water and coated onto the surface of a foodstuff, preferably the uncooked dough crust of a meat or fruit pie. Upon heating the coated foodstuff with microwave radiation, a desirable browned surface is developed on the crust during the time normally required to bake the pie, due to the formation of colored Maillard reaction products in the coating composition at microwave temperatures.

A bottom crust for a pie having a raw dough base containing a reducing sugar and an amino acid source to induce a Maillard-type browning reaction and caramelization browning during microwave exposure has also been described. U.S. Pat. No. 4,917,907. A preferred bottom crust contains a reducing sugar such as dextrose, an amino acid source such as whey solids, a dough conditioner to prevent dough shrinkage and a leavening agent to enhance browning and to provide a puffy crust. Pies made with this bottom crust are placed into a tray which is composed of a microwave-interactive material. Maillard-type browning reactions occur upon exposure of the bottom crust dough to microwave energy which causes water in the dough to become heated which in turn causes the dough to become heated. Caramelization browning reactions occur due to heat conducted from the tray into the bottom crust dough, which additionally gives the dough a crispier texture. A pie made with this bottom crust may also comprise a top crust dough. The top crust dough preferably has a laminate structure comprising a conventional dough coated with a reactive dough of a composition similar to the bottom crust dough.

Currently available browning agents and products containing browning agents have greatly increased the palatability of microwave cooked foodstuffs. There is a need, however, to improve the appearance, texture, and taste of microwaveable foodstuffs even further. This need is particularly felt in the area of frozen meat pies, one of the most commonly purchased frozen food items in the United States. Meat pies, commonly known as pot pies, require a long amount of time for proper conventional oven cooking, making the microwave a preferred option for cooking this foodstuff. Unfortunately, even with the various browning agents and additives currently being added to make pot pies more appetizing out of the microwave, most microwaved pot pies have a less appetizing dough color, texture, or flavor than those cooked in a conventional oven.

The present state of the art demands further improvements to be made in browning agents. Browning agents are needed that do not introduce an undesirable flavor into the foodstuff being browned. There is a definite need for foodstuffs containing browning agents that look attractive and yet may be quickly heated and browned even under the most demanding conditions of microwave ovens.

SUMMARY OF THE INVENTION

This invention is directed to a browning agent for foodstuffs having at least two carbonyl groups. Some compounds useful in the practice of this invention include tetroses, pentoses and hexoses having at least two carbonyl groups. A useful hexose having at least two carbonyl groups include those of the formula $C_6H_8O_7$. A useful hexose having at least two carbonyl groups includes 2,5-di-keto gluconic acid (2,5-DKG or DKG).

In addition, the present invention is directed to a browning composition comprising said browning agent having at least two carbonyl groups. In one aspect, the browning agent has two carbonyl groups. In another aspect the browning agent has three carbonyl groups. In still another aspect the browning agent has four carbonyl groups. The composition may comprise of the browning agent and an amine source. The amine source may be separately added or endogenous to the substrate.

In addition, a method for preparing a substrate for browning in a microwave oven or other cooking methodology, thus simulating the brown coloration of an item cooked in a conventional oven, is also provided. The method comprising the steps of providing a browning composition comprising a sugar or sugar acid having at least two carbonyl groups; and incorporating or applying said browning composition to a food stuff. In one embodiment the step of incorporating the browning composition or browning agent in a foodstuff includes topically applying the browning composition to the foodstuff. In another embodiment incorporating the browning composition includes mixing the browning composition into the foodstuff.

This invention will be further understood along with its benefits and advantages with reference to the following detailed description.

BRIEF DESCRIPTION OF THE DRAWINGS

FIG. 1 is a drawing of the chemical formula of the aldose form of the browning agent;

FIG. 2 is a drawing of the chemical formula of the ketose form of the browning agent; and FIG. 3 is a drawing of the conversion pathway of glucose to 2,5-di-keto gluconic acid.

DETAILED DESCRIPTION

The term "browning agent" refers to compounds that effect a brown discoloration which emulates the color of a cooked or baked foodstuff even when heated to cooking temperatures in a microwave oven.

The term "browning composition" refers to compositions that incorporate the browning agent. The browning composition is incorporated in or applied to a substrate to effect a desired brown coloration. For example, the browning composition can be applied to foodstuffs to effect a brown discoloration which emulates the color of a cooked or baked foodstuff even when heated to cooking temperatures in a microwave oven.

The term "substrate" refers to a material to which the browning agent/composition is applied or incorporated within to effect the desired brown coloration. Substrates include treated or untreated skin or hair, including leather, human skin and hair; paper; and foodstuffs.

The term "foodstuffs" refers to materials consumed by mammals, including, but not limited to dairy, meat products and by-products; starch and carbohydrate products; and fruits and vegetables. The foodstuffs can be in various forms, for example baked, mashed, shredded, boiled, broiled, steamed, etc.

The term "dairy products" refers to products directly or indirectly produced by animals for consumption by humans, including, but not limited to eggs (cooked in a variety of ways, e.g., fried, boiled, poached, scrambled); milk (including flavored milk, e.g., chocholate); yogurt; and cheeses.

The terms "meat products" and "meat by-products" refers to poultry (chicken, turkey, goose, duck), venison, beef, pork, vegetable substitutes and mixtures thereof; and products used with (e.g., sausage casings, meal) using various anatomical portions of the exemplary animals.

The term "baked goods" as used herein refers to products of a flour, ground grain or dough-based that are baked at elevated temperatures, including, but not limited to pastry products, biscuits, pie crusts, pie coverings, meat pie shells, breads, and pizzas.

The term "starch and carbohydrate products" refers to bakery goods, pastas, meals, whole grains, including rice based products.

The term "fruits and vegetables" as used herein refers to botanical products including whole fruits, nuts and vegetables (e.g., mushrooms, potatoes, etc.), purees, jams, preserves, soups and soy-based protein substitutes derived from fruits and vegetables.

The term "sugar acid" refers to a sugar molecule that contains a carboxylic acid group (—COOH), usually at C1. An exemplary sugar acid includes various ascorbic acid intermediates, e.g., 2-keto-L-gluconic acid (2KLG), 2-keto-D-gluconic acid (2KDG), 5-keto-L-gluconic acid (5KLG), 5-keto-D-gluconic acid (5KDG), and 2,5-diketo gluconic acid (2,5DKG or DKG).

The term "sugar" refers to carbohydrate molecules, for example polysaccharides, disaccharides, and monosaccharides. Useful monosaccharides have the empirical formula $(CH_2O)_n$, wherein n=3–7. The sugars, including but not limited to the sugars of FIGS. 1 and 2, include aldoses and ketoses.

The term "substantially transparent" refers to the composition being as colorless or as nearly transparent as possible prior to the activation or color change effected by the Maillard reaction of the browning agent with the amine source.

The term "preparing a foodstuff for browning" refers to the steps performed to enable the product to achieve the brown coloration in foodstuffs generally seen in such foodstuffs after cooking in conventional/convection/open flame methodologies.

The present invention relates to browning compositions that include browning agents having at least two (2) carbonyl groups. The browning compositions are applied to substrates to provide a brown coloration. Incorporating the browning compositions in or to a substrate, e.g., a foodstuff, includes various methods of providing the browning agent or browning composition including the browning agent to the substrate. Exemplary methods include topically applying the browning composition to the foodstuff, or mixing the browning composition or browning agent into the foodstuff. Topically applying the browning composition includes spraying the composition to the substrate and/or mechanically applying the browning composition to the substrate. The compounds may be heated, as in microwave methodologies, to accelerate and accentuate the browning effect. Alternatively, alternative heat sources, for example infrared radiation, convectional heating sources may also be used. These browning compositions and/or agents could be used in applications, not limited to, but including foodstuffs, self-tanning agents, hair dyes, printing inks, leather tanning, dietary supplement, and protein and or amino acid indicators.

The present invention relates to browning compositions and compounds that are applied to a substrate, such that when the substrate is heated, the compound induces a golden brown color. Maillard reactions of value are not limited to the food industry, and it is believed that these compounds would be of value anywhere a brown color is desirable.

The present invention relates to browning compositions and compounds that are applied to foodstuffs, such that when the foodstuffs are microwaved, baked, or otherwise heated, the browning compound induces a golden brown color.

The present invention also relates to browning agents, compositions and methods for effecting a brown color emulating a cooked condition in microwave cooked foodstuffs. Such food stuffs include applications such as meat products and by-products as set forth in U.S. Pat. No. 5,135,770; bakery goods as set forth in U.S. Pat. Nos. 5,756,140, and 5,196,219; microwavable foodstuffs in general as set forth in U.S. Pat. No. 4,252,832; and is mashed potato products as set forth in U.S. Pat. No. 6,261,612, expressly incorporated by reference herein.

The present invention also relates to methods for treating substrates with a browning agent; browning compositions containing such browning agents for application to such substrates; and substrates incorporating such compositions.

The substrates of the present invention can be treated with or manufactured to incorporate a browning agent to enhance browning of the substrate when it is heated.

The present invention also relates to methods for treating foodstuffs with a browning agent; compositions containing such browning agents for application to such foodstuffs; and foodstuffs comprising such compositions. The foodstuffs of the present invention can be are treated with or manufactured to incorporate a browning agent to enhance browning of the foodstuff when it is heated in a microwave or conventional oven. In one embodiment, the method includes the step of topically applying the browning agent or composition to the foodstuff. In another embodiment, the method includes the step of mixing the browning composition into the foodstuff.

A browning agent useful in the practice of this invention includes tetrose, pentose and hexose sugars and their respective sugar acids. The browning agent includes these sugars or sugar acids having at least two carbonyl groups. In one embodiment, the browning agent includes sugars or sugar acids having two carbonyl groups. In another embodiment, the browning agent includes sugars or sugar acids having three carbonyl groups. In still another embodiment, the browning agent includes sugars or sugar acids having four carbonyl groups. Useful compounds have a carboxyl group as C1. Tetroses include D-erythrose and/or D-threose. Pentoses contemplated by the inventors include D-ribose; D-arabinose; D-xylose; and/or D-lyxose. Hexoses contemplated by the inventore include, but are not limited to D-aldoses and D-ketoses. Exemplary aldoses include D-allose, D-altrose, D-glucose, D-mannose, D-gulose, D-idose, D-galactose, and D-talose. Exemplary ketoses include, but are not limited to D-fructose and D-sorbose. See FIGS. 1 and 2. Compounds having at least two carbonyl groups include carbonyls at various permutations at the C1–C6 positions. For hexoses, the numbering is as set forth in FIGS. 1–3, which is consistent with the nomenclature convention set forth in the recommendations of 1996 by the International Union of Pure and Applied Chemistry and the International Union of Biochemistry and Molecular Biology, which is incorporated by reference herein. Compounds contemplated as useful by the inventors include those sugars or sugar acids described as ascorbic acid intermediates. Compounds contemplated as useful include those hexose derivatives having such at least two carbonyl groups. Compounds contemplated as useful by the inventors include those sugars or sugar acids having such at least two carbonyl groups, for example, various two carbonyl, three carbonyl, and/or four carbonyl permutations, including, but not limited to 2-keto-L-gluconic acid (2KLG), 2-keto-D-gluconic acid (2KDG), 3-keto-L-gluconic acid, 4-keto-L-gluconic acid, 5-keto-L-gluconic acid (5KLG), 1,2-diketo gluconic acid, 1,3-diketo gluconic acid, 1,4-diketo gluconic acid, 1,5-diketo gluconic acid, 1,6-diketo gluconic acid, 2,3-diketo gluconic acid, 2,4-diketo gluconic acid, 2,5-diketo gluconic acid, 2,6-diketo gluconic acid, 3,4-diketo gluconic acid, 3,5-diketo gluconic acid; 3,6-diketo gluconic acid, 4,5 diketo gluconic acid; 4,6-di-keto gluconic acid, 5,6-di-keto gluconic acid, 1,2,3-tri-keto gluconic acid, 1,2,4-tri-keto gluconic acid, 1,2,5-tri-keto gluconic acid, 1,2,6-tri-keto gluconic acid, 2,3,4-triketo gluconic acid, 2,3,5-tri keto gluconic acid; 2,3,6-tri keto gluconic acid; 3,4,5 tri keto gluconic acid; 3,4,6 tri keto gluconic acid, 4,5,6-tri-keto gluconic acid, 1,2,3,4-tetra-keto gluconic acid, 1,2,3,5-tetra-keto gluconic acid, 1,2,3,6-tetra-keto gluconic acid, 1,2,4,5-tetra-keto gluconic acid, 1,2,4,6-tetra-keto gluconic acid, 1,2,5,6-tetra-keto gluconic acid, 2,3,4,5-tetra-keto gluconic acid, 2,3,4, 6-tetra-keto gluconic acid, 2,3,5,6-tetra-keto gluconic acid, 2,4,5,6-tetra-keto gluconic acid, and/or 3,4,5,6-tetra-keto gluconic acid. Those skilled in the art will recognize that these same gluconic acid derivatives having at least two carbonyl groups, while specifically describing glucose and/or glucose sugar acids substituted compounds, can also be applied to the other exemplary hexoses described above.

While not wanting to be limited by theory, the inventors believe that browning from the Maillard reaction occurs when a sugar bonds to an amine and is heated. In an example with D-glucose, a small amount of open chain form of glucose is present in equilibrium with the cyclic form. When in it's linear form the aldehyde group of glucose will react with an amine to form a Schiff's base. The unstable Schiff's base rearranges to an enol losing a water molecule. The enol is rearranged to form 1-amino,1-deoxy-D-fructose, which undergoes Amadori rearrangement (M. Amadori, *Atti Accad. Nazl Lincei*, Vol. 2, Number 6, p. 337 (1925)) to form 5-hydroxymethyl-2-furaldehyde, which polymerizes to form a brown colored polymer.

The browning agents of the present invention can be synthesized chemically; and/or synthesized enzymatically. Enzymatic synthesis can be by the use of isolated, purified, or extracts containing the enzymatic pathways known to manufacture the browning agent. For example, the conversion pathway of glucose to 2,5-DKG is provided in FIG. 3. 2,5-DKG has been synthesized by using in vitro enzymatic methods (PCT Publication No. WO 00/37667 issued to Boston, et al). In addition, 2,5-DKG has been synthesized in vivo as a fermentation end-product (U.S. Pat. No. 4,879,229 issued to Sonoyama; and U.S. Pat. No. 3,790,444 issued to Oga). Isolation of 2,5-DKG has been described in Wakisaka, Y., *Agric. Biol. Chem.* Vol. 28, pp. 819–827 (1964). Many microorganisms are capable of oxidizing glucose and other sugars to mono and di-keto products. Examples are Acetobacter (Katznelso, H., et al, *J. Biol. Chem.* Vol. 4, pp. 43–59 (1953)), *Pseudomonas* (Wakisaka, Y., *Agric. Biol. Chem.*, Vol. 28, pp. 819–827 (1964)); and *Erwinia* (U.S. Pat. No. 4,879,229 issued to Sonoyama). As shown in FIG. 3, D-glucose is first oxidized to D-gluconate, which is then oxidized to 2-keto-D-gluconate, which is then oxidized to 2,5-diketo-D-gluconate. As the reactions are extracellular, the product can be easily recovered from the ferment broth by standard cell separation techniques and used without further purification. This provides as an additional level of cost advantage over other commercially available browning products and methodologies.

U.S. Pat. No. 4,879,229 describes the manufacture of 2,5-DKG from glucose utilizing a genetically modified microorganism. Referring to FIG. 3 of the present application, it is noted that 2,5-DKG has three carbonyl groups, C1, C2, and C5. It has been discovered that 2,5-DKG is particularly useful in that it reacts with high specific activity in the Maillard browning reaction. While not wanting to be held to a specific theory, it is believed that the oxidation state of 2,5-DKG is responsible for the high activity in Maillard browning. It has been found that 2,5-DKG will form the brown color typical of Maillard chemistry more efficiently than D-glucose or the oxidized precursors of 2,5-DKG. Surprisingly, it was found that 2,5-DKG was able to form a synergistically darker shade of coloration than the additive coloration effects of 2-keto gluconic acid and 5-keto gluconic acid. It is likely that the higher reactivity of 2,5-DKG in the Maillard reaction is due to chemical equilibria favoring the more Schiff's base reactive linear form in combination with the electron withdrawing effects of two keto groups per molecule.

The manufacture of other ascorbic acid intermediates has also been described. The manufacture of 2-keto-L-gulonic acid has been described in U.S. RE30872 (Sonoyama, et al), U.S. Pat. No. 3,907,639 (Makover, et al), and U.S. Pat. No. 5,032,514 (Light, et al). In addition, the Reichstein synthesis (U.S. Pat. No. 2,301,811) provides additional means to manufacture sugars or sugar acids having at least two carbonyl groups. Vendors are also available to purchase sugars or sugar acids having at least two carbonyl groups, e.g., 2KDG (Sigma-Aldrich, St. Louis, Mo., USA, catalogue No. K 6250) and 5KDG (Sigma-Aldrich, catalogue Nos. K1500 and K4125).

The browning composition of the present invention incorporates the browning agent as described above and an amine source. The amine source can be supplied as a separate source, e.g., added solutions or compositions, or as an endogenous element of the substrate, e.g. pineapple juice is known to contain endogenous amine sources. The amine source can be supplied optionally in solutions for application of the browning agent/browning composition to substrates, the composition may include an aqueous carrier or other solubilizing agent, e.g., water. While an aqueous carrier is beneficial to enable the application of the browning compound to the substrate surface by topical application or spraying, application of a dry mixture of the browning agent with or without the amine source to the substrate is contemplated by the inventors.

The amine source provides nitrogen for the Schiff's base formation of the Maillard reaction. The amine source can be added separately, either applied to the substrate or mixed in with the substrate, added together with the browning agent as a component of the browning composition, or can be already found in the substrate or substrate surface. It will be recognized by those skilled in the art that stiochiometric equimolar ratios of the amine source to browning agent will increase according to the number of carbonyl groups on the browning agent. The nitrogen containing compound can be in the range of 0.01% to about 40%, another useful range is between 0.01% and 35%, another useful range is between 0.01% and 25% and still another useful range is between 0.01% and 20%. The nitrogen containing compound can be an inorganic or organic compound. Exemplary inorganic compounds useful in the practice of the invention are ammonium salts. For example, ammonium salts useful in the practice of the invention include, but are not limited ammonium carbonate, ammonium bicarbonate, ammonium hydroxide, ammonium chloride, ammonium acetate, ammonium persulfate, ammonium dihydrogen phosphate, ammonium benzoate, ammonium sulfate, ammonium bisulfate, ammonium citrate, ammonium tartrate, ammonium phosphate, ammonium nitrate, ammonium oxalate, and mixtures thereof.

Exemplary organic amine compounds include materials that include an amine ($NH_3$) or amide ($NH_2$) group. Exemplary organic compounds include water-soluble amino acids, amides, amines, proteins, protein hydrolyzatse, peptides, hydrolyzed collagen, and mixtures thereof. Amino acids contemplated by the inventors include, but are not limited to alanine (Ala or A), arginine (Arg or R); asparagine (Asn or N); aspartic acid (Asp or D); cysteine (Cys or C), glutamine (Gln or Q), glutamic acid (Glu or E), glycine (Gly or G), histidine (His or H), isoleucine (Ile or I), leucine (Leu or L), lysine (Lys or K), methionine (Met or M), phenylalanine (Phe or F), proline (Pro or P), serine (Ser or S), threonine (Thr or T), tryptophan (Trp or W), tyrosine (Tyr or Y) and/or valine (Val or V). Of the amino acids mentioned, those having a basic side chain, lysine, arginine and/or histidine are preferred. In addition, organic sources for amines can also be present in the substrate as a normally occurring or present component in the substrate. For example, amino acids could be found naturally in meat products or meat by-products.

The browning composition incorporating the browning agent can also include other excipients such as fats, oils, carbohydrates, proteins, peptides, vitamins, salts, stabilizers, emulsifiers, and/or preservatives used by those skilled in the art in combination with the substrate or food stuffs. It is also contemplated that the browning agent of the present invention be used in combination with other known browning materials and/or methods. Exemplary browning materials include, but not limited to, reducing sugars (i.e., those not having at least two carbonyl groups) such as dextrose, maltose, fructose, lactose, hydroxyacetaldehyde, dihydroxyacetone, mono- and di-saccharides, rhamnose, ribose, edible bases, or any combination thereof.

The browning composition may additionally comprise an oil-in-water emulsion as described in U.S. Pat. No. 4,968,522 or encapsulating agents such as liposomes or waxes (see U.S. Pat. Nos. 5,089,278 and 5,091,200) to prevent the browning agent from reacting with the surface of the foodstuff or substrate until it is subjected to heat or other effecting irradiation, e.g., microwave radiation. The browning composition can also be used in mashed potatoes, pastry crusts and other similar foodstuffs as described in U.S. Pat. No. 6,261,612.

The browning agent should be present in an amount sufficient to effect the desired browning development on the desired foodstuff or mashed potato product. In general, depending on the nature of the particular browning agent employed, the desired browning effect can be achieved by using from about 0.1% to about 10%, and preferably from 0.1% to 1.0%, by weight of the browning agent based on the weight of the foodstuff or substrate, e.g., a mashed potato, pastry or other composition. Lower relative amounts can be used when coating only the top surface of product with substantial thickness. The most preferred browning agent 2,5 DKG is advantageously employed in useful quantities as in 0.001% to 40% by weight, from 0.001% to 20% by weight, from 0.001% to 10% by weight and/or 0.1 to 5% by weight. Some exemplary concentrations include 0.001–1000 mM, 0.01–500 mM, and/or between 0.1 to 100 mM concentrations of the browning agent. Examples have been described later in this application with the browning agent at concentrations of 10 mM.

It has been found to be useful to have the pH of the browning composition be between 2 and 13, be between 3 and 10, and/or be between 3.5 and 6. Examples have been described later in this application with the browning composition pH at 4 and at pH 5.

The effect of the browning can be ascertained by various spectrophotometric or visual inspection methods. For example, the spectrophotometric absorbance taken at between 500 and 700 nm, between 570 and 620 nm, for example 590 or 610 nm, is useful in ascertaining the browning of the browning compound, assessing the ability of the browning agent to provide the desired level of coloration or comparing the ability of the browning agent relative to untreated or substrates treated with other browning inducing materials. The specific wavelength used can be between 500 to 700 nm, so long as the spectra of both the browning agent and the control (browning agent less substrate, e.g., foodstuff) are ascertained at the same wavelength. However, 610 nm was found to be useful in ascertaining the efficacy of the browning agent.

For example, a spectrophotometric analysis of a solution of about 0.1% to 5% by weight of agent at pH 2–13 at room temperature as applied to a foodstuff will provide an indication of the browning effected by the browning agent. Color absorbance measuring methodologies of carmelization are useful in this regards. For example, the strength of caramel color is defined as its tinctorical power $K_{0.610}$. This can be defined as the absorbance of a 0.1% weight/volume solution measured through a 1 cm light path at a wavelength of 610 nm using a high quality spectrophotometer. In another embodiment, this can be defined as the absorbance of a 10 mM browning agent solution measured through a 1 cm light path at a wavelength of 610 nm using a high quality spectrophotometer. The higher the value of the absorbance, the tinctorial power $K_{0.610}$, the darker the browning effect. In one aspect of the present invention, the absorbance of 0.010 or greater at 610 nm indicates browning. In another aspect of the invention, the absorbance of 0.050 or greater at 610 nm indicates browning. In other aspects of the invention, absorbances of 0.075, 0.080 or greater indicates browning. In still another aspect, an exemplary sugar acid compound with three carbonyl groups exhibited an absorbance of greater than 0.500, 0.750, 0.800, 0.900 and/or 0.950 at 610 nm.

Another method that can be utilized to ascertain the efficacy of the browning agent is to visually compare the effect of the browning agent on the foodstuff to a standard or standards. One method includes the use of a series of cards or photos of differing shades of brown and comparing those standards with the actual browned foodstuff. Comparisons to known or reproducible color standards are another method for establishing the amount of browning effect. For example, the color of crayons (Crayola, Easton Pa., USA) "raw sienna" and/or "burnt sienna" are useful in describing the coloration achieved by browning agents.

Using such methods, comparing browning reactions of 2,5-DKG to similar and yet less oxidized molecules can be made. In visually comparing the brown foodstuff with various other compounds, the efficacy of the browning agent can be demonstrated. UV-vis spectra of the browning agent vs. glucose can be compared. An exemplary browning agent, 2,5-DKG, and possibly any other multi-oxidized sugar or sugar acid is a superior browning agent and can be applied in a practical manner where browning is desirable.

The present invention is also directed to meats, pastries, pies, preferably meat and/or vegetable pot pies, mashed potato compositions, vegetables or other foodstuffs incorporating such browning agents, wherein the browning color is desired. It is contemplated that the foodstuff compositions of the present invention provide a pleasant texture and stark background color contrast to the golden brown color produced by the browning agent, making the resulting food both appear and taste more palatable than the traditional flour dough topped pies. The browning agent composition topping also allows for more desirable appearance than conventional dough toppings no matter the power and type of microwave or conventional oven used to cook the pie. Additionally, mashed potato composition topped meat pies utilizing the present invention can provide consumers with a palatable looking and tasting product which includes both meat and potatoes, a favorite combination particularly of American consumers.

The browning composition of the present invention can be utilized in conjunction with sausage casings, poultry, beef, pork pastries and the requisite compositions thereof, as described elsewhere, which are incorporated by reference herein. For example, use of a browning agent with sausage casings are described in detail in U.S. Pat. No. 5,135,770. For example, use of a browning agent with poultry and/or bakery products is described in detail in U.S. Pat. No. 4,252,832. For example, use of a browning agent with potato products is described in detail in U.S. Pat. No. 6,261,612 issued to Underwood. The inventors contemplate the use of the present browning agents in the same usages for emulating the brown color of a food stuff cooked in a conventional oven in a microwave context.

The browning composition of the present invention may be used in methods for preparing substrates, e.g., foodstuffs, for browning in a microwave oven or other cooking methodology wherein the brown coloration seen in conventional convection oven/open flame cooking is absent, but desired. Such method includes providing a browning composition in or to a substrate, e.g., foodstuff and incorporating the browning agent and amine source in or on the substrate, e.g., foodstuff. The browning composition and amine source are incorporated into or onto the substrate, e.g., foodstuffs, by topically applying, spraying, mixing or blending cooked or partially cooked foodstuffs with sufficient amounts of the browning agents or browning compositions to achieve the desired coloration and also adding various additional ingredients such as described above, and cooling the resulting composition. The additional browning agent may be added to the foodstuffs before, during, or after the cooking process. The cooled composition is treated with a browning agent either before or after the food stuff is frozen. The browning agent may be brushed onto the surface of the food stuff, mixed with a portion of the food stuff and this portion may then be layered onto the remaining composition, spray coated onto the surface of the food stuff or dipped into the food stuff. A liquid product including the browning agent can be prepared by diluting the browning agent in water to form a solution having the above described ranges. The resulting solution is coated, e.g., by spraying onto the top of the food stuff composition. The food stuff composition of the present invention may be individually frozen for sale as a separate side dish, or may be added as a side dish to a conventional frozen dinner entree.

Foodstuffs having the browning agents that may be browned include natural ingredients such as flours, carbohydrates and the like, having the necessary reactants such as reducing sugars, reducing sugars and amino acids, carbonyls derived from lipids, and the like components that may react under heat. These reactants are well known and may also be present in other foodstuffs such as meats. Foodstuffs or other substrates, e.g., dairy products, meat products, baked goods, starch and carbohydrate products, fruits and vegetables, for example, biscuits, pizza, hash brown potatoes, taco shells, breads, pastry shells, pastas, eggs, sausage casings, chicken, turkey, pizza, pie coverings, hash brown potatoes and other such foodstuffs may be browned with the browning agent of this invention. Furthermore, it has been found that the browning agent of this invention may be incorporated into or coated onto such foodstuffs, placed in cold frozen storage at about −30° C. to 10° C., and removed for direct microwave browning.

In one contemplated use of the present invention, a pie is topped with a mashed potato composition including the browning agent as described above. The pie may have a filling portion comprising meat, poultry, fish, vegetables, starches, sauces, seasonings, preservatives, and/or any other pie fillings, which are commonly palatably consumed with mashed potatoes. In another embodiment, a browning agent topped pie of the present invention may comprise a flour-based dough bottom crust, a bread or crumbled bread bottom crust, or no bottom crust at all. When the browning agent topped pie of the present invention is cooked in a 400° F. oven for about 50 minutes or in a microwave for about 8 to 10 minutes at high power, the filling portion becomes heated through properly and the browning agent becomes a very pleasing golden brown color.

Any additional ingredients commonly added to frozen foodstuffs are also contemplated for use in combination with the browning agent, composition and methods of using the same as set forth in this application. Among the traditional food preservatives that can be advantageously employed are BHA/BHT, citric acid, acetic acid, tocopherols, sodium chloride, sodium nitrate, TBHQ, disodium EDTA, propyl gallate, lactic acid producing bacteria, sodium tripolyphosphate, stearyl citrate, sugars, nitrogen, ascorbic acid, sodium citrate, potassium sorbate, sorbic acid, calcium proponate, and the like.

In another embodiment of the present invention, a foodstuff incorporating the browning agent may also comprise various vegetables, meats, or other ingredients commonly presented or combined with such foodstuffs. Garnishes such as parsley, broccoli, mushrooms, crumbled bacon or the like may also be included.

A browning agent composition topped foodstuff of the present invention may further be packaged in a container comprising a microwave-interactive material such as a metalized layer of polyester film or any other commonly used material. See U.S. Pat. Nos. 4,190,757, 4,641,005, and 4,917,907. The microwave-interactive material may be present in the top of a food container so that the food stuff will receive additional heat during microwave cooking, resulting in an even deeper golden brown color and a slight crispiness. The microwave-interactive material may additionally be present throughout the pie container to impart additional color and texture to any bottom crust materials.

The browning agent of this invention is suitable for use with foodstuffs having carbonyl-containing browning reactants exemplified by those foodstuffs naturally containing brownable mono- and polysaccharides, especially reducing sugars with or without amino acids, that are known to induce browning. Water-in-oil or inverted fat emulsions as described in U.S. Pat. No. 5,043,173 issued to Steinke, et al, are suitable for use according to the principles of this invention.

A browning composition for foodstuffs is disclosed. The browning composition can be advantageous by reducing cooking time, lowering the concentration of carcinogenic compounds normally produced by cooking, and by providing an enhanced aesthetic value to foods. Furthermore the use of browning agents which are not caramelized sugars reduces the side-effects of that may result from the use of such sugars, e.g., sweetness.

The following examples are given to illustrate preferred embodiments of this invention and are not intended to limit the invention in any way. It should be understood that this invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLES

Unless otherwise indicated, materials were used as purchased without additional fractionation or purification. Dextrose (Dex 333) was purchased from A. E. Staley (Decatur, Ill., USA). 2-keto-D-gluconic acid (2KDG, Cat. No. K 6250) and 5-keto-D-gluconic acid (5KDG, Cat. Nos. K1500 and K 4125) were purchased from Sigma-Aldrich (St. Louis, Mo., USA). 2-keto-L-gluconic acid (2-KLG), and 2,5-diketogluconic acid (DKG) were provided by Genencor International (Palo Alto, Calif.). Fully cooked turkey breast ("Butterball", Butterball Turkey Company, Downers Grove, Ill., USA) was purchased at a retail grocery store. L-lysine (L-LYS HCL) was purchased from Ajinomoto U.S.A., Inc. (Torrance, Calif.). A comparative browning agent sold under the tradename Maillose® (code 3001003, a composition with the active ingredient of hydroxy acetaldehyde, also known as glycoaldehyde) was purchased from Red Arrow Products, LLC (Manitowas, Wis., USA). The potatoes used were No. 1 Russet potatoes purchased at a retail grocery store. Pineapple juice (Dole Food Company, Inc., Westlake Village, Calif., USA) was purchased at a retail grocery store.

The following equipment was used in the experimentals unless otherwise noted. The conventional oven used was a Whirlpool Corporation (Benton Harbor, Mich.), Model RF385PXE. The microwave oven used was a General Electric (Louisville, Ky.), Model JE1340. Thermometer used was an Omega Engineering Corporation (Stamford, Conn.), Model OmegaTemp Type K. The spectrophotometer was a Hewlett Packard (Palo Alto, Calif.), Model 8453.

Example 1

In a first assessment of the ability of the browning agent to effect a brown coloration, samples of the respective compounds at pH 5.0 and at the same concentrations were compared. The more oxidized the sugar, the more superior it is for the browning effect. Glucose, and differing oxidation products of glucose were tested for browning effect in pineapple juice (Dole Food Company, Westlake Village, Calif., USA) diluted to one-tenth strength and by heating the samples to 90° C. for 3 hours. A sample from a freshly opened can of pineapple juice was mixed with a sufficient amount of the purported browning agent to achieve a concentration of 100 mM. Pineapple juice was useful in that it endogenously provides an amine source. The mixture was then diluted 1 to 10 with water to achieve a 10 mM concentration. The resulting solution was heated to 90° C. and then maintained at that temperature for a 3 hour period. The substrate samples were then visually examined and assigned a degree of browning on a 1 to 10 scale (the darkest color being assigned 10). The table below indicates differences in degree of browning for the oxidation products as judged by visual assessment, and reported with a ten point scale where 0=minimum coloration and 10=maximum coloration.

In addition, a spectrophotometric assessment of the degree of browning was also performed. The samples for assessment were prepared as described above. The absorbance at 610 nm ($A_{610}$) was determined on a Hewlett Packard Model 8453 Spectrophotometer at default settings. The results are shown in Table 1 below.

TABLE 1

| Name | Formula | Degree of browning | $A_{610}$ |
|---|---|---|---|
| Water | $H_2O$ | 0 | 0.000 |
| Glucose | $C_6H_{12}O_6$ | 0 | 0.003 |
| Gluconic acid | $C_6H_{12}O_7$ | 0 | 0.002 |
| 2-keto-D-gluconic acid | $C_6H_{10}O_7$ | 1 | 0.093 |

TABLE 1-continued

| Name | Formula | Degree of browning | $A_{610}$ |
|---|---|---|---|
| 2-keto-L-gulonic acid | $C_6H_{10}O_7$ | 1 | 0.105 |
| 5-keto-D-gluconic acid | $C_6H_{10}O_7$ | 3 | 0.334 |
| 2,5-diketo-D-gluconic acid | $C_6H_8O_7$ | 10 | 0.968 |

It was noted that the effects of oxidation at position 2 (2KLG and/or 2KDG), and at position 5 (5KDG), when added together, are less than when both the positions are combined or present on a single molecule (2,5 DKG).

Example 2

Carbohydrate Trials (Raw Potato Slices)

Methods and Materials

Materials and equipment used in this study are listed above. The methods and experimental design are summarized below:

1. Experimental Browning Agent Solutions

Solutions were made the day of testing and kept refrigerated until the test evaluations began. At the time of testing, the solutions were all removed from the refrigerated conditions and placed into an ice water bath to keep the solutions all at the same temperature and to keep the 2,5 diketo-D-gluconic acid (DKG) solutions below 40° F. to prevent any decomposition. Table 2 lists the solutions prepared and defines their composition.

Solutions A through D were prepared from stock solution E. Solution E was prepared by dissolving 50 grams per liter 2,5-DKG is deionized water. References to "% DKG" in Table 2 refer to a specified dilution of the stock solution E (for example, 100% DKG means at 50 gm/liter). Solutions F and G were prepared from a commercially available Maillose® sample, identified in the materials section above. "% Maillose" refers to a specified dilution of the Maillose® solution as received from Red Arrow Products.

Solutions A through G were prepared in 20 ml quantities volumetrically using graduated pipettes to dispense the appropriate quantities of the agents and deionized water. Solutions K through R were prepared in 10-ml quantities volumetrically using 5-ml graduated pipettes to measure 5-ml of the browning agent solution and 5-ml of the appropriate L-Lysine solution. Solutions H, I, and J were prepared on a weight (grams) by volume (ml) basis.

TABLE 2

List of Solutions and Composition

| Solution | Label | Composition |
|---|---|---|
| A | Blank | 100% Deionized Water |
| B | DKG-L1 | 25% DKG |
|   |   | 75% Deionized Water |
| C | DKG-L2 | 50% DKG |
|   |   | 50% Deionized Water |
| D | DKG-L3 | 75% DKG |
|   |   | 25% Deionized Water |
| E | DKG-L4 | 100% DKG |
| F | M-L1 | 25% Maillose ® |
|   |   | 75% Deionized Water |
| G | M-L2 | 50% Maillose ® |
|   |   | 50% Deionized Water |

TABLE 2-continued

List of Solutions and Composition

| Solution | Label | Composition |
|---|---|---|
| H | GLU-L1 | 50 g/L Dextrose |
| I | LY1 | 15 g/L L-Lysine |
| J | LY2 | 25 g/L L-Lysine |
| K | DKGL1-LY1 | 50% Solution B |
|   |   | 50% Solution I |
| L | DKGL2-LY1 | 50% Solution C |
|   |   | 50% Solution I |
| M | DKGL3-LY1 | 50% Solution D |
|   |   | 50% Solution I |
| N | DKGL4-LY1 | 50% Solution E |
|   |   | 50% Solution I |
| O | DKGL1-LY2 | 50% Solution B |
|   |   | 50% Solution J |
| P | DKGL2-LY2 | 50% Solution C |
|   |   | 50% Solution J |
| Q | DKGL3-LY2 | 50% Solution D |
|   |   | 50% Solution J |
| R | DKGL4-LY2 | 50% Solution E |
|   |   | 50% Solution J |

1. Method for Dosing the Browning Agents

During development of the experimental design, it was determined that 0.2 ml of solution (e.g., water, browning agents, etc.) was sufficient to cover (wet) the surface of a raw potato slice. By using a graduated pipette, the dosage could be accurately and quickly applied to the surface of the food and provide similar surface moisture for all test samples. The dose was applied to the center of the slice and allowed to spread across the potato slice on its own. This dosage level (0.2 ml) was used throughout the entire study.

2. Experimental Design

Each of the following tests was repeated three times.

TABLE 3

Experimental Design for Raw Potatoes, no lysine added

| Microwave | Time (sec) | Test A | Test B | Test C | Test D |
|---|---|---|---|---|---|
| 1 | 60 | Blank | M-L1 | GLU-L1 | DKG L1 |
| 2 | 80 | Blank | M-L1 | GLU-L1 | DKG L1 |
| 3 | 100 | Blank | M-L1 | GLU-L1 | DKG L1 |
| 1 | 60 | Blank | M-L2 | GLU-L1 | DKG L2 |
| 2 | 80 | Blank | M-L2 | GLU-L1 | DKG L2 |
| 3 | 100 | Blank | M-L2 | GLU-L1 | DKG L2 |
| 1 | 60 | Blank | M-L2 | GLU-L1 | DKG L3 |
| 2 | 80 | Blank | M-L2 | GLU-L1 | DKG L3 |
| 3 | 100 | Blank | M-L2 | GLU-L1 | DKG L3 |
| 1 | 60 | Blank | M-L2 | GLU-L1 | DKG L4 |
| 2 | 80 | Blank | M-L2 | GLU-L1 | DKG L4 |
| 3 | 100 | Blank | M-L2 | GLU-L1 | DKG L4 |

TABLE 4

Experimental Design for Raw Potatoes, with lysine added

| Microwave | Time (sec) | Test A | Test B | Test C | Test D |
|---|---|---|---|---|---|
| 1 | 60 | Blank | M-L2 | DKGL1-LY1 | DKGL1-LY2 |
| 2 | 80 | Blank | M-L2 | DKGL1-LY1 | DKGL1-LY2 |
| 3 | 100 | Blank | M-L2 | DKGL1-LY1 | DKGL1-LY2 |
| 1 | 60 | Blank | M-L2 | DKGL2-LY1 | DKGL2-LY2 |
| 2 | 80 | Blank | M-L2 | DKGL2-LY1 | DKGL2-LY2 |
| 3 | 100 | Blank | M-L2 | DKGL2-LY1 | DKGL2-LY2 |
| 1 | 60 | Blank | M-L2 | DKGL3-LY1 | DKGL3-LY2 |
| 2 | 80 | Blank | M-L2 | DKGL3-LY1 | DKGL3-LY2 |
| 3 | 100 | Blank | M-L2 | DKGL3-LY1 | DKGL3-LY2 |
| 1 | 60 | Blank | M-L2 | DKGL4-LY1 | DKGL4-LY2 |
| 2 | 80 | Blank | M-L2 | DKGL4-LY1 | DKGL4-LY2 |
| 3 | 100 | Blank | M-L2 | DKGL4-LY1 | DKGL4-LY2 |

1. Microwave Trials

Three identical microwaves were utilized for testing so that each microwave could cool between samples. The microwave chosen for testing was a 1000-watt GE (model JE1340) microwave with turntable set at high power. This wattage was chosen as it is the currently the most common wattage available for consumer use in home.

Deionized water (100 grams) in a 250-ml beaker was evaluated at 60, 80 and 100 seconds to determine the temperature that water would see in the microwaves as a possible standardization tool. At 60, 80 and 100 seconds, water was boiling at 212° F., 218.5° F. and 218.5° F. respectively.

2. Raw Potato Test Methods

Number 1 russet potatoes were peeled, rinsed and sliced to 5-mm thickness using a Hobart (Troy Ohio) Model 84142 slicer on the day of testing. The sliced potatoes were held at ambient conditions in deionized water to minimize any natural browning prior to testing. The potato slices chosen for testing were approximately 3.5 to 4.5 cm wide and 5 to 6 cm long.

Four potato slices were placed equal distances apart toward the outer edge of a paper plate. The surfaces of the potatoes were patted dry with a paper towel before the solutions (Table 1) were applied to the potato slice. Solution application order was randomized among the three repetitions. Graduated pipettes were used to dispense the solutions at the center of the potato slice. After the last solution was applied a 15-second rest period was given for the solution to spread over the potato slice before initiating the cook time.

After the cook time was complete, the surface temperature was quickly read on all four slices using a wire thermocouple on an OmegaTemp Type K thermometer. Color was evaluated by visually noting the differences in the appearance of the potato slices and recording lightness to darkness using a 15-point scale (0=light, 15=dark).

Overall, the DKG solutions were functional in browning raw potato slices in the microwave. Color standards selected for the DKG and Maillose® solutions were Crayola Crayons of "burnt sienna" and "raw sienna", respectively.

Table 5 summarizes the results of the 1-minute trials on raw potato slices in the microwave. The glucose and water solutions did not brown while all the other test solutions of DKG, Maillose, and DKG in combination with varying lysine levels all resulted in some level of browning. Surface temperatures were highly variable and difficult to measure as the surface immediately began cooling when the microwave oven turned off. The high standard deviations indicate that the method used for recording the surface temperature in the microwave was not accurate, but on average the surface temperature for 1 minute in the microwave was mid 160° F.

Light to darkness ratings show Maillose L1 and DKG L1 to be similar after a 1 minute cook time and Maillose L2 was similar to DKG L2 and DKG L3. Addition of lysine to the DKG component resulted in similar light to dark ratings compared to the straight DKG solutions; however, lysine L2 in combination with DKG L4 (effectively a 50% dilution) resulted in a similar or slightly darker rating than the DKG L4 (100% solution) applied straight.

Table 6 demonstrates the results of the same solutions cooked on raw potatoes for 1 minute 20 seconds in the microwave. Similar to the 1 minute cook times, the DKG and Maillose products all browned while the blank and the glucose solutions did not show any browning with the exception of some dark streaks naturally occurring the potato. The surface temperatures again were highly variable and were actually lower than the 1-minute results on average.

The longer cook time for this set of samples demonstrated more differences with the lysine addition than at the 1-minute cook time. Addition of lysine L1 to the DKG component resulted in similar or slightly darker colors as the straight solutions with only half of the DKG present. The exception to this is the DKGL1 with lysine L1 where this difference was not found. Increasing the level of lysine (L2) did not result in darker colors, but yielded very similar results to the lysine L1 addition.

TABLE 5

Results of Browning Agents applied to Raw Potato Slices and heated in a 1000-watt microwave oven for 1 minute on high power.

| Variable | Surface Temp. °F. | Light to Dark Rating | Comments |
|---|---|---|---|
| Blank (Water) | 162.3 (n = 24, s.d. = 2.35) | 1 (n = 24) | no browning |
| Glucose L1 | 164.3 (n = 12, s.d. = 7.19) | 1 (n = 12) | no browning |
| Maillose L1 | 163.6 (n = 3, s.d. = 9.01) | 4.66 (n = 3) | even color, similar color to DKG L1 |
| Maillose L2 | 164.2 (n = 21, s.d. = 6.70) | 5.8 (n = 21) | even brown color with slight orange tone, more red orange vs. DKG |
| DKG L1 | 163.6 (n = 3, s.d. = 7.63) | 4.66 (n = 3) | slight browning, similar to Maillose L1 |
| DKG L2 | 164.3 (n = 3, s.d. = 6.03) | 5.66 (n = 3) | uneven browning, similar to DKG L1 at 1 min 20 sec. |
| DKG L3 | 173.0 (n = 3, s.d. = 3.6) | 5.66 (n = 3) | slight brown with orange red tones similar to Maillose L2 |
| DKG L4 | 161.3 (n = 3, s.d. = 11.0) | 7 (n = 3) | brown and slightly darker than Maillose L2 |
| DKGL1-LY1 | 159 (n = 3, s.d. = 5.19) | 3.33 (n = 3) | slightly brown, uneven color |
| DKGL2-LY1 | 162.3 (n = 3, s.d. = 0.57) | 3.66 (n = 3) | similar tone to Maillose L2, lighter with few dark spots |
| DKGL3-LY1 | 166 (n = 3, s.d. = 4.36) | 4.33 (n = 3) | uneven color, slightly more brown than Maillose L2 |
| DKGL4-LY1 | 164 (n = 3, s.d. = 1.0) | 5.66 (n = 3) | similar to Maillose L2, more brown color and slightly lighter |
| DKGL1-LY2 | 159.3 (n = 3, s.d. = 7.23) | 2.66 (n = 3) | slightly lighter than DKG L1-LY1 |
| DKGL2-LY2 | 161.3 (n = 3, s.d. = 0.58) | 3.66 (n = 3) | similar to DKG L2-LY1 |
| DKGL3-LY2 | 165.6 (n = 3, s.d. = 4.62) | 4.66 (n = 3) | uneven color, slightly more brown less red than Maillose L2 |
| DKGL4-LY2 | 165.0 (n = 3, s.d. = 1.73) | 7.66 (n = 3) | dark brown color with some dark streaks |

TABLE 6

Results of Browning Agents applied to Raw Potato Slices and heated in a 1000-watt microwave oven for 1 minute 20 seconds on high power.

| Variable | Surface Temp. °F. | Light to Dark Rating | Comments |
|---|---|---|---|
| Blank (Water) | 164.9 (n = 23, s.d. = 7.63) | 1 (n = 24) | no browning |
| Glucose L1 | 160.2 (n = 12, s.d. = 7.88) | 1 (n = 12) | no browning |

TABLE 6-continued

Results of Browning Agents applied to Raw Potato Slices and heated in a 1000-watt microwave oven for 1 minute 20 seconds on high power.

| Variable | Surface Temp. ° F. | Light to Dark Rating | Comments |
|---|---|---|---|
| Maillose L1 | 165.3 (n = 3, s.d. = 10.59) | 6.66 (n = 3) | even color, light brown/orange, similar color to DKG L1 |
| Maillose L2 | 159.5 (n = 20, s.d. = 8.41) | 7.76 (n = 20) | even brown color with slight orange tone, more red orange vs. DKG, similar to DKG L2 |
| DKG L1 | 162.6 (n = 3, s.d. = 7.76) | 7 (n = 3) | slight more brown than Maillose L2, uneven browning, dark streaks |
| DKG L2 | 169.6 (n = 3, s.d. = 5.13) | 8 (n = 3) | similar darkness to Maillose L2, more brown less orange |
| DKG L3 | 166.0 (n = 3, s.d. = 1.73) | 10.33 (n = 3) | dark streaks, brown red background less orange than Maillose L2 |
| DKG L4 | 154.6 (n = 3, s.d. = 6.50) | 10.33 (n = 3) | less orange red than Maillose L2, dark streaks |
| DKGL1-LY1 | 158.6 (n = 3, s.d. = 7.37) | 5 (n = 3) | light brown background, uneven color, dark streaks |
| DKGL2-LY1 | 148.3 (n = 3, s.d. = 9.24) | 9.33 (n = 3) | similar tone to Maillose L2 but more brown, darker streaks |
| DKGL3-LY1 | 163 (n = 2, s.d. = 0.0) | 9.66 (n = 2) | uneven color, darker brown than Maillose L2, dark streaks |
| DKGL4-LY1 | 163.6 (n = 3, s.d. = 4.04) | 9 (n = 3) | uneven color, less red than Maillose L2, dark streaks |
| DKGL1-LY2 | 155 (n = 3, s.d. = 6.25) | 5.33 (n = 3) | uneven color, more brown than Maillose L2, slightly darker than DKG L1-LY1 |
| DKGL2-LY2 | 153.6 (n = 3, s.d. = 13.58) | 9.33 (n = 3) | similar to DKG L2-LY1, uneven color |
| DKGL3-LY2 | 167 (n = 3, s.d. = 2.83) | 10.66 (n = 3) | uneven color, darker than DKG L3-LY1, dark brown streaks |
| DKGL4-LY2 | 162.3 (n = 3, s.d. = 4.16) | 9 (n = 3) | uneven color, similar to DKG L4-LY1 |

The last set of tests on the raw potatoes utilized the same solutions as previous tests but they were subjected to 1 minute 40 seconds in the microwave oven. Higher darkness ratings were noted for the straight DKG solutions and at the DKG L4 the color was looking very dark, especially on the dark streaks from the potato. Maillose® did not get as dark as the DKG. Surface temperature again was highly variable.

Lysine L1 and L2 were fairly similar in their results with lysine L2 yielding slightly darker ratings overall due to slightly darker streaks showing up on the potato. In comparison to the straight DKG solutions, the lysine addition generally appeared to help the darkness of the color when less DKG is utilized. It appears that the cook time and/or temperature range where the lysine addition can replace a portion of the DKG component to yield the same or similar color result may be very specific.

TABLE 7

Results of Browning Agents applied to Raw Potato Slices and heated in a 1000-watt microwave oven for 1 minute 40 seconds on high power.

| Variable | Surface Temp. ° F. | Light to Dark Rating | Comments |
|---|---|---|---|
| Blank (Water) | 156.6 (n = 24, s.d. = 8.58) | 1.41 (n = 24) | no browning, some brown streaks |
| Glucose L1 | 156.8 (n = 12, s.d. = 6.82) | 1.75 (n = 12) | no browning, some brown streaks |
| Maillose L1 | 164 (n = 2, s.d. = 8.48) | 8.5 (n = 2) | even color, brown/orange |
| Maillose L2 | 147.5 (n = 22, s.d. = 12.5) | 9.95 (n = 22) | even brown color with slight more red orange vs. DKG |
| DKG L1 | 158 (n = 2, s.d. = 2.82) | 10 (n = 2) | slight more brown than Maillose L1, uneven browning, dark streaks |
| DKG L2 | 157 (n = 3, s.d. = 6.24) | 12 (n = 3) | uneven color, darker streaks than Maillose L2 |

TABLE 7-continued

Results of Browning Agents applied to Raw Potato Slices
and heated in a 1000-watt microwave oven for 1 minute
40 seconds on high power.

| Variable | Surface Temp. °F. | Light to Dark Rating | Comments |
|---|---|---|---|
| DKG L3 | 157.3 (n = 3, s.d. = 7.76) | 12 (n = 3) | darker overall than Maillose L2, some dark burnt streaks |
| DKG L4 | 145 (n = 4, s.d. = 12.99) | 12.25 (n = 4) | burnt lines on potato, moderately dark background |
| DKGL1-LY1 | 145.3 (n = 3, s.d. = 2.08) | 8.66 (n = 3) | lighter than Maillose L2, uneven color, similar dark streaks |
| DKGL2-LY1 | 148 (n = 3, s.d. = 10.39) | 11 (n = 3) | similar to Maillose L2 but more brown less red |
| DKGL3-LY1 | 147 (n = 3, s.d. = 11.14) | 13 (n = 3) | uneven color, darker brown and less red than Maillose L2, dark streaks |
| DKGL4-LY1 | 143.3 (n = 3, s.d. = 17.39) | 9 (n = 3) | uneven color, black brown streaks, slightly burnt looking |
| DKGL1-LY2 | 146.6 (n = 3, s.d. = 1.52) | 9 (n = 3) | uneven color, similar to Maillose L2, slightly darker than DKG L1-LY1 |
| DKGL2-LY2 | 146 (n = 3, s.d. = 10.39) | 11 (n = 3) | slightly darker streaks and background than DKG L2-LY1, uneven color |
| DKGL3-LY2 | 153.6 (n = 3, s.d. = 8.08) | 11.66 (n = 3) | uneven color, areas of orange/brown and black, dark streaks |
| DKGL4-LY2 | 145 (n = 3, s.d. = 15.09) | 13.66 (n = 3) | uneven color, black brown streaks, burnt black brown looking |

Example 3

Protein Trials (Turkey Slices)

Methods and Materials

Materials and equipment used in this study are as described above. The methods and experimental design are summarized below:

1. Experimental Browning Agent Solutions

Solutions were prepared exactly the same way as in the carbohydrate study and the same solution compositions were evaluated (Table 2).

2. Method for Dosing the Browning Agents

Similar to the raw potato slice, it was determined that 0.2 ml of solution (e.g., water, browning agents, etc.) was sufficient to cover (wet) the surface of the precooked turkey is slice. The solutions were applied to the center of the turkey slice using a graduated pipette. The dose was allowed to spread across the turkey slice on its own. This dosage level (0.2 ml) was used throughout the entire study.

3. Experimental Design

Each of the following tests was repeated three times.

TABLE 8

Experimental Design for Turkey Slices, no lysine added

| Position | Time | Test Sample |
|---|---|---|
| 1 | 5 min | Blank |
| 2 | 5 min | Glucose L1 |
| 3 | 5 min | Maillose L1 |
| 4 | 5 min | Maillose L2 |
| 5 | 5 min | DKG - L1 |
| 6 | 5 min | DKG - L2 |
| 7 | 5 min | DKG - L3 |
| 8 | 5 min | DKG - L4 |

TABLE 9

Experimental Design for Turkey Slices, with lysine added

| Position | Time | Test Sample |
|---|---|---|
| 1 | 5 min | Blank |
| 2 | 5 min | Maillose L2 |
| 3 | 5 min | DKGL1-LY1 |
| 4 | 5 min | DKGL1-LY2 |
| 5 | 5 min | DKGL2-LY1 |
| 6 | 5 min | DKGL2-LY2 |
| 7 | 5 min | DKGL3-LY1 |
| 8 | 5 min | DKGL3-LY2 |
| 9 | 5 min | DKGL4-LY1 |
| 10 | 5 min | DKGL4-LY2 |

1. Oven Trials

The oven selected for testing was a Whirlpool Super Capacity 465 Electric Range (model RF385PXE). The oven was allowed to preheat to 500° F. prior to testing, with the oven rack set in the middle position for testing. For all trials in the conventional oven, the temperature was set at 500° F.

2. Turkey Test Methods

Fully cooked Butterball Turkey Breast cut into ¼ inch slices was used for this study. The slices were subsequently cut using a two-inch round cookie cutter to provide a similar surface area for the application of the varying solutions. The turkey samples were held at refrigerated conditions until ready to apply solutions and evaluate.

Eight to ten turkey samples were placed on a parchment paper lined 13"×18"×1" metal baking pan. The order in which the test solutions were applied was randomized among the three repetitions in the experimental design. Graduated pipettes were used to dispense the solutions at the center of the turkey slice. After the last solution was applied a 15-second rest period was given for the solution to spread over the surface before initiating the cook time in the conventional oven.

After the cook time was complete and while the samples were still in the oven, the surface temperature was quickly read on all slices using a wire thermocouple on an Omega-Temp Type K thermometer. After removing the samples from the oven, color was evaluated by noting the differences in the appearance of the turkey slices and recording lightness to darkness using a 15 point scale (0=light, 15=dark).

Overall, DKG functioned as a browning agent on the protein base (turkey slices). The browning effect was seen in all levels of DKG and in solutions with lysine. Crayola Crayons "raw sienna" for the Maillose hue and "burnt sienna" for the DKG hue can characterize the colors best.

Table 9 shows the results of the trials by variable for the 5-minute cook time at 500° F. in a conventional oven. Surface temperatures of the turkey slices ranged from 156° F. to 166° F. while the averages within each variable were 160.3° F. to 164.3° F. No browning effect was found in the Blank (water) or the Glucose L1 samples. Maillose L1 and L2 browned more evenly over the surface of the protein than did the DKG samples and they were more typical of expected brown colors. The DKG samples browned to more of an orange tone and increasing dosage levels created darker colors. Solutions containing Lysine L1 performed similarly to the straight solutions of DKG. This indicates that lysine addition can reduce the level of DKG by approximately 50% to yield the same color ratings. Lysine L2 in combination with the DKG variations (L2, L3, and L4) did result in slightly darker colors than the straight DKG solutions or the DKG solutions with Lysine L1. These may or may not be significant enough differences to warrant the added cost of using a higher lysine level.

Table 11 shows the results of one set of samples evaluated after a longer duration (8 minutes) at 500° F. Surface temperatures on these samples were 175° F. to 185° F. The colors on these samples became darker with the increase cook time and surface temperature. The two different Lysine levels in solutions with the varying DKG levels did not show any differences with added heat exposure. Only a small amount of lysine may be required since the solution is being applied to a protein base.

TABLE 10

Results of Browning Agents applied to Turkey Slices and heated in a conventional oven for 5 minutes at 500° F.

| Variable | Surface Temp. ° F. | Light to Dark Rating | Comments |
| --- | --- | --- | --- |
| Blank (Water) | 162.5 (n = 6, s.d. = 2.35) | 2 (n = 6) | no browning |
| Glucose L1 | 160.3 (n = 3, s.d. = 3.05) | 2 (n = 3) | no browning |
| Maillose L1 | 161.3 (n = 3, s.d. = 3.51) | 4 (n = 3) | slight browning, more red/brown color vs. DKG samples |
| Maillose L2 | 162.3 (n = 6, s.d. = 2.80) | 5.83 (n = 6) | even color, more red/brown vs. DKG |
| DKG L1 | 160.3 (n = 3, s.d. = 3.78) | 3.33 (n = 3) | slight yellow orange color |
| DKG L2 | 162.6 (n = 3, s.d. = 4.93) | 4.33 (n = 3) | light orange, darker than DKG L1 |
| DKG L3 | 161.0 (n = 3, s.d. = 3.6) | 5.33 (n = 3) | uneven color, similar to Maillose L2, more orange in color |
| DKG L4 | 161.3 (n = 3, s.d. = 4.72) | 7 (n = 3) | uneven color, darkest of all straight DKG samples, darker than Maillose L2, slight burnt edges and more red/orange color |
| DKGL1-LY1 | 161.6 (n = 3, s.d. = 1.52) | 3 (n = 3) | very light yellow to yellow/orange color |
| DKGL2-LY1 | 163.6 (n = 3, s.d. = 0.57) | 4 (n = 3) | uneven color, yellow/orange color slightly darker than DKGL1-LY1 |
| DKGL3-LY1 | 162.3 (n = 3, s.d. = 3.2) | 5 (n = 3) | red/orange color, similar to DKG L2-LY2 |
| DKGL4-LY1 | 162.3 (n = 3, s.d. = 1.52) | 6.66 (n = 3) | more red/orange in color vs. Maillose L2, similar in color and slightly darker than DKG L3-LY2 |
| DKGL1-LY2 | 164.3 (n = 3, s.d. = 1.15) | 3.33 (n = 3) | very light yellow to slight orange color, similar to DKG L1-LY1 |
| DKGL2-LY2 | 163.3 (n = 3, s.d. = 1.52) | 4.66 (n = 3) | orange color, darker than DKG L2-LY1 |
| DKGL3-LY2 | 163.6 (n = 3, s.d. = 1.15) | 6 (n = 3) | red/orange color, similar to DKG L3-LY1 |
| DKGL4-LY2 | 164.0 (n = 3, s.d. = 1.0) | 7.66 (n = 3) | darkest red/orange color, slightly darker than DKG L4-LY1 |

TABLE 11

Results of Browning Agents applied to Turkey Slices and heated in a conventional oven for 8 minutes at 500° F.

| Variable | Surface Temp. ° F. (n = 1) | Light to Dark Rating (n = 1) | Comments |
| --- | --- | --- | --- |
| Blank (Water) | 180 | 2 | no browning |
| Maillose L2 | 178 | 8 | very brown |
| DKGL1-LY1 | 179 | 4 | very light yellow |
| DKGL2-LY1 | 175 | 5 | red/orange color, same at DKGL2-LY2 |
| DKGL3-LY1 | 178 | 8 | slight burnt edge, more red/orange vs. Maillose L2 |
| DKGL4-LY1 | 184 | 8 | burnt edge, similar to DKG L3-LY1 |
| DKGL1-LY2 | 182 | 4 | slight yellow orange |
| DKGL2-LY2 | 174 | 5 | same as DKG L2-LY1 |
| DKGL3-LY2 | 182 | 9 | burnt edge, darker than DKG L3-LY1 |
| DKGL4-LY2 | 185 | 8 | burnt edges, Lysine L1, and L2 similar for DKG L4 |

Obviously, many modifications and variations of the invention as hereinbefore set forth can be made without departing from the scope thereof, and, therefore, only such limitations should be imposed as are indicated by the appended claims.

The invention claimed is:

1. A browning composition for application to a foodstuff comprising 2, 5 diketo-gluconic acid as a browning agent in an amount sufficient to effect browning and an amine source.

2. The browning composition of claim 1, wherein the amine source is an amino acid or combination of amino acids.

3. The browning composition of claim 1, wherein the foodstuff is a meat product or meat by-product.

4. The browning composition of claim 1, wherein the foodstuff is a dairy product.

5. The browning composition of claim 1, wherein the foodstuff is a baked good.

6. The browning composition of claim 1, wherein the foodstuff is a starch and carbohydrate product.

7. The browning composition of claim 1, wherein the foodstuff is a vegetable product.

8. The browning composition of claim 1, wherein said browning composition is an aqueous solution.

9. The browning composition of claim 1, wherein the concentration of the browning agent is between 0.01mM and 500 mM.

10. A method of preparing a foodstuff for browning in a microwave oven, the method comprising
providing a browning composition comprising a sugar acid having at least two carbonyl groups as a browning agent in an amount sufficient to effect browning; and
incorporating said browning composition in a foodstuff, wherein the amount or browning agent is from 0.001% to 40% by weight of the foodstuff.

11. The method of claim 10, wherein the browning agent is a gluconic acid derivative and the concentration of the browning agent in the browning composition is 0.01mM to 500 mM.

12. The method of claim 10, wherein said browning composition is an aqueous solution.

13. The method of claim 10, wherein said browning composition is a dry mixture.

14. The method according to claim 10, wherein the sugar acid is a hexose sugar acid substituted compound having between two and four carbonyl groups.

15. The method according to claim 14, wherein the hexose sugar acid is a gluconic acid derivative.

16. The method according to claim 15, wherein the gluconic acid derivative is 2-keto-L-gulonic acid (2KLG), 2-keto-D-gluconic acid (2KDG), 5-keto-L-gluconic acid (5KLG) or 5-keto-D-gluconic acid (5KDG).

17. The method according to claim 10, wherein the sugar acid is 2, 5 diketo-gluconic acid.

18. The method according to claim 10, wherein the sugar acid has three carbonyl groups.

19. The method of claim 10, wherein said step of incorporating said browning composition in a foodstuff includes the step of topically applying said browning composition to the foodstuff.

20. The method of claim 10, wherein said step of incorporating said browning compositions in a foodstuff includes the step of mixing said browning composition into said foodstuff.

21. The method of claim 10, wherein said foodstuff is selected from the group consisting of turkey, sausage casings, chicken, biscuits, pizza, pie covering and hash brown potatoes.

22. The method according to claim 10 further comprising adding an amine source to the browning composition.

23. The method according to claim 22, wherein the amine source is an amino acid or combination of amino acids.

24. The method according to claim 23, wherein the amino acid is lysine, arginine, histidine or combinations thereof.

* * * * *